US006501961B1

(12) United States Patent
Kirkpatrick

(10) Patent No.: US 6,501,961 B1
(45) Date of Patent: Dec. 31, 2002

(54) POWER SAVING MODE FOR WIRELESS TELEPHONES

(75) Inventor: Jim Kirkpatrick, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/412,346

(22) Filed: Oct. 5, 1999

(51) Int. Cl.[7] .............................. H04B 1/38; H04M 1/00
(52) U.S. Cl. ...................................... 455/553; 455/574
(58) Field of Search ................................ 455/553, 574, 455/343, 552, 260, 434, 515; 395/375; 318/408; 235/454

(56) References Cited

U.S. PATENT DOCUMENTS 5,167,024 A * 11/1992 Smith et al.
5,175,874 A * 12/1992 Auchter
5,471,655 A * 11/1995 Kivari
5,613,235 A * 3/1997 Kivari et al.
5,752,201 A * 5/1998 Kavari
5,806,007 A * 9/1998 Raith et al.

* cited by examiner

*Primary Examiner*—Nguyen T. Vo
(74) *Attorney, Agent, or Firm*—Harness, Dickey & Pierce, PLC

(57) ABSTRACT

Reducing power consumption in a dual mode wireless phone, such as a CDMA/AMPS phone, that monitors messages from a forward overhead channel in a standby mode is desirable. It includes turning a receiver off after decoding a pertinent word for the receiver in a particular message and turning it on again some time prior to a next pertinent word. The turn-on is initiated only if necessary to satisfy a redundancy check or if the next word is a beginning of a next message.

16 Claims, 5 Drawing Sheets

| SLEEP | FM | RX CHAIN |
|---|---|---|
| 0 | 0 | ON |
| 0 | 1 | OFF |
| 1 | 0 | ON |
| 1 | 1 | ON |

POWER SAVING MODE FOR WIRELESS TELEPHONES

BACKGROUND

This invention relates to a power saving mode in a wireless telephone system.

Wireless telephones, using code division multiple access (CDMA) modulation techniques or other analog frequency modulation (FM) based wireless systems such as the Advanced Mobile Phone System (AMPS), may be operated in a standby mode to conserve power provided by a battery. During the standby mode, wireless telephones often continuously receive and monitor a stream of signaling data messages sent by a base station while waiting to receive a telephone call. One of these data message streams is on a forward overhead control channel (FOCC).

An FOCC message, shown in FIG. 1, includes a dotting word, a word-sync, and repeating words A and B. The wireless telephone uses the dotting or bit-sync word to synchronize the phone hardware to the clock of the data message. The word-sync indicates the present location in the data stream to the wireless telephone and that the data sequence is about to start. Also imposed on the message data stream are busy-idle bits, each of which is sent between every ten bits of the message to indicate the status of the system channel. The repeat words A and B each contains 40 bits, and each word is repeated five times in the message. The wireless phone receives both of these words but only processes one of them. If the wireless phone's Mobile Identification Number (MIN) is even, word A is processed; otherwise word B is processed. However, in order to receive and process these words, the wireless phone's receiver must be on and drawing power the entire time, thereby reducing the time a wireless, battery-powered telephone can be used for communication.

SUMMARY

The present disclosure reduces the time that the receiver in the wireless telephone is on, and therefore drawing power, while in a standby mode. Wireless telephones that are particularly suited for this purpose include analog phones such as AMPS phones and other wireless devices that are capable of operating in multiple modes, such as the CDMA and the AMPS.

In one aspect, the disclosure features an improved method of reducing power consumption in a dual mode wireless phone, such as a CDMA/AMPS phone, that monitors messages from a forward overhead channel in a standby mode. The phone has a receiver that receives RF signals. The method includes turning the receiver off after decoding a pertinent word for the receiver in a particular message and turning it on again approximately one millisecond prior to a next pertinent word. The turn-on is initiated only if necessary to satisfy a redundancy check or if the next word is a beginning of a next message. The above steps are repeated for the next message.

In one embodiment, the redundancy check is satisfied if at least three out of five pertinent words are matched. In another embodiment, the redundancy check is satisfied if the pertinent word matches a previously defined control-filler message.

In another aspect, the disclosure features a circuit for providing a sleep state for both modes of the dual mode phone. The circuit includes a transistor having a base, a collector, and an emitter terminals, a supply voltage coupled to the collector terminal, a mode signal providing input to the base terminal, and a sleep signal providing input to the emitter terminal. When the sleep signal is asserted in a particular mode indicated by the mode signal, the collector terminal is driven to turn the receiver off.

DETAILED DESCRIPTION

A wireless telephone system that reduces the time the phone receiver is on, and therefore reduces the time that power is being drawn, is desirable. In the Advanced Mobile Phone System's (AMPS) standby mode, the receiver's primary function is to listen to the forward overhead control channel (FOCC). An FOCC word is formed by encoding 28 information bits and 12 bits of parity into a 40-bit codeword. Each codeword is alternately repeated five times (A-B-A-B-A-B-A-B-A-B), so that the receiver can perform three-out-of-five majority voting upon decoding the data. The repetition provides redundancy against radio channel distortion, such as fades in amplitude and impulsive noise.

The inventor noticed that the receiver often can avoid having to listen to all five words by taking advantage of certain system properties. For example, if all of the first three words are decoded identically, the three-out-of-five voting is complete, and the receiver could go to "sleep" for the remaining two words. Further, there are conditions for returning to "sleep" after reception of only one or two words. When a base station has no other messages to send, it sends what are known as "control-filler" messages. This condition can occur more than 50% of the time. The receiver compares the first and/or second word properties of the previous control-filler message, and if they match, the receiver can go to "sleep" early.

The FOCC message is transmitted using a wideband data at a 10 kbits/sec rate. This results in 100 microseconds or 0.1 milliseconds for each bit. Since each A or B word is augmented by four busy-idle bits, the total message length for each word is 44 bits or 4.4 milliseconds.

Figure 1:
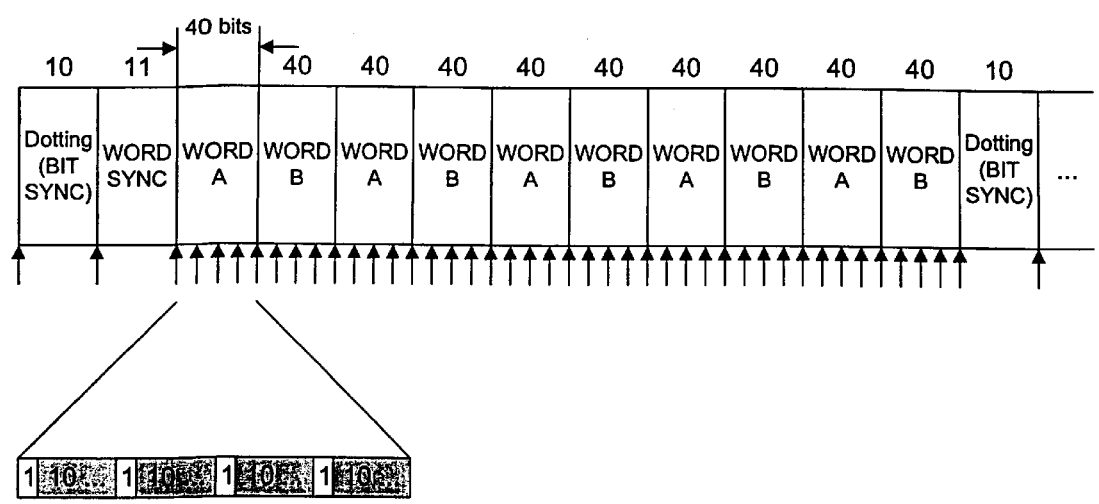
FIG. 1 is a forward overhead control channel (FOCC) message format.
Figure 2:
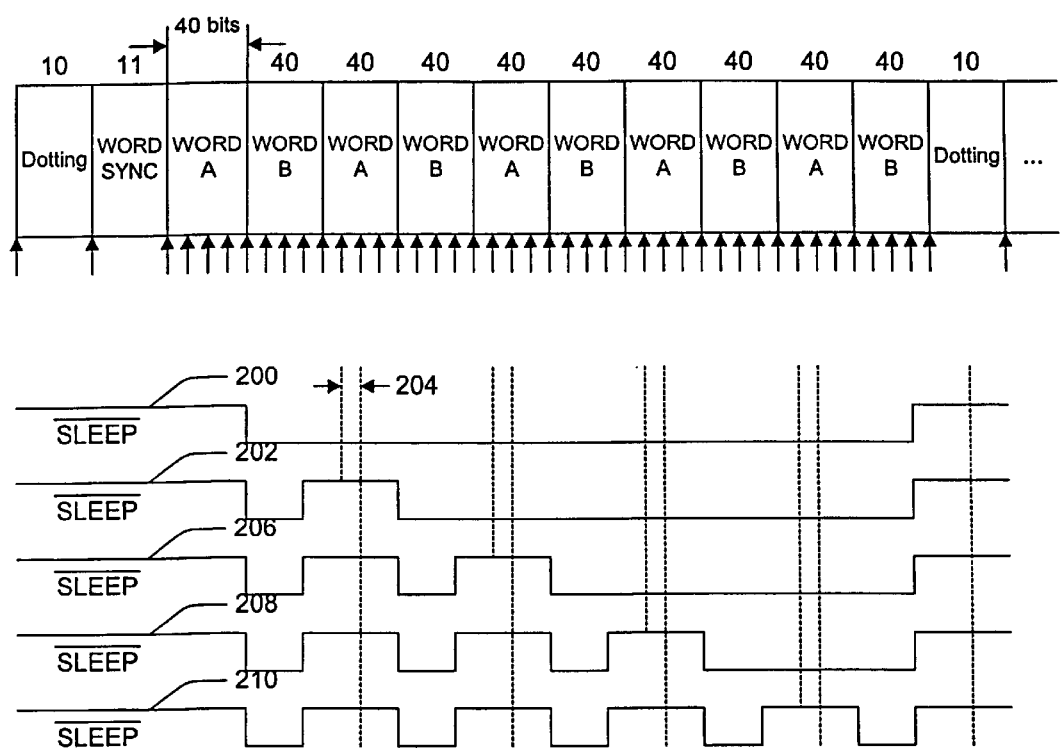
FIG. 2 is a timing diagram of a "slotted A/B mode" implementation of a wireless telephone.

FIG. 2 shows a timing diagram of a "slotted A/B mode" implementation of a wireless telephone with an even Mobile Identification Number (MIN). The "slotted A/B mode" enables "sleep" in analog phones such as the AMPS phones. The diagram shows timing information of a $\overline{\text{SLEEP}}$ pin in a CDMA/AMPS dual mode phone. In this mode, the receiver processor decodes the first word A, then puts the receiver to "sleep" during the first B word. The processor then quickly wakes the receiver up for the next word A, and so on. The process however requires the response time of the receiver electronics to be significantly faster than the 4.4 millisecond time slot of each word.

For example, the inventor found that 4.4 milliseconds is not enough time to turn on or off the main phased-lock loop (PLL) circuitry, which takes about 6 to 7 milliseconds to settle to an operating level. However, it was found that the receiver chain including the PLL regulator can be toggled on or off with less than one millisecond settling or response time. Another problem with switching of the main PLL circuitry is the PLL frequency pulling due to abrupt changes in the load impedance of the mixer in the receiver. Frequency recovery can also be achieved in less than one millisecond by toggling only the receiver chain. Therefore, the concept of a "sleep" mode in the AMPS phone is possible if the receiver chain is turned off after decoding the initial word and reawakened approximately one millisecond ahead of the next word to be decoded.

The first diagram 200 (FIG. 2) shows a case in which the receiver processor commands the receiver to a "sleep" mode by turning the regulator off after decoding only one A word. The next diagram 202 shows a case in which the receiver processor decodes two A words. Since it takes up to one millisecond to bring the regulator to its operating level, the diagram 202 shows the receiver turning the regulator on approximately one millisecond before the beginning of the second A word 204. Using a system with this timing diagram, the receiver will be ready by the time the second A word is to be decoded. The subsequent read, if necessary, can be performed using similar timing as shown 206, 208, 210.

Figure 3:
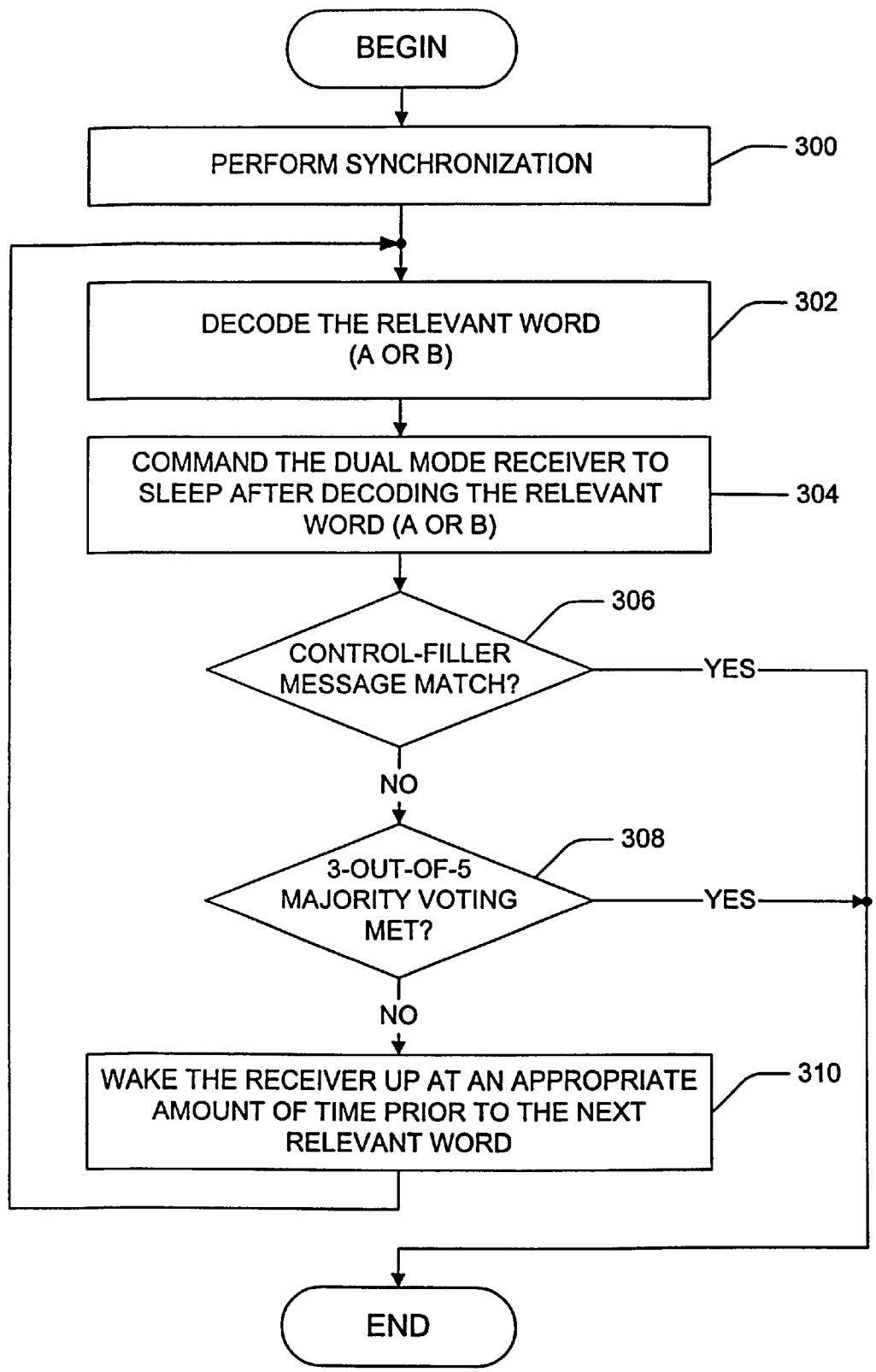
FIG. 3 is a flow diagram of the slotted A/B mode in a dual mode wireless telephone.

A flow diagram of the slotted A/B mode in a dual mode wireless telephone is illustrated in FIG. 3. Initially, the receiver processor decodes the sync words to synchronize the receiver electronics to the clock of the data message (step 300). The receiver processor also decodes the first relevant word, at step 302. The relevant word can be an A word or a B word depending on the MIN. Next, the processor commands the receiver to sleep by turning the receiver chain off, at step 304. The processor then checks if there is a match in the control-filler message (step 306) or the 3-out-of-5 majority voting (step 308). If there is a match in either one of the above conditions, the receiver stays in the sleep mode until the next message. Otherwise, in step 310, the processor wakes the receiver up at an appropriate amount of time prior to the next relevant word. In a preferred embodiment, the appropriate amount of time is approximately one millisecond.

Figure 4A:
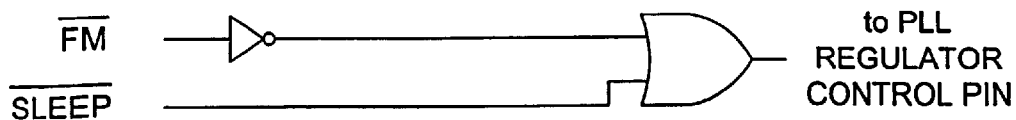
FIGS. 4A and 4B are circuit diagrams for an RF control circuitry to enable a "sleep" mode for the AMPS portion of the CDMA/AMPS dual mode phone.

FIG. 4A shows a circuit diagram for an RF control circuitry 400 that enables a "sleep" mode for the AMPS portion of the CDMA/AMPS dual mode phone. The circuit turns off the PLL regulator voltage during CDMA sleep but keeps the main PLL active during the slotted FM mode.

Figure 4B:
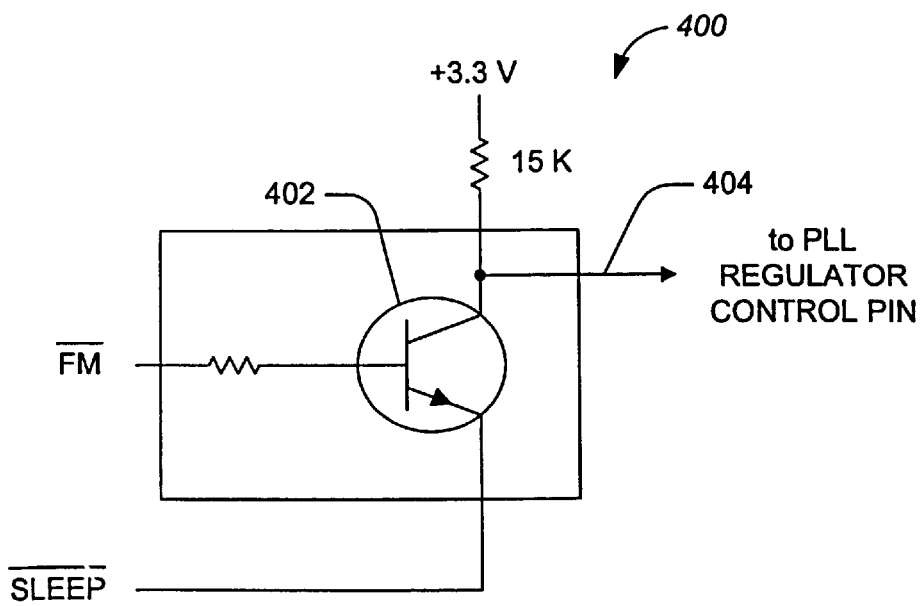

A schematic diagram of the AMPS sleep mode circuitry using a transistor is shown in FIG. 4B. According to the diagram, the only time the transistor 402 is turned on is when the PM input is at logic high and the $\overline{\text{SLEEP}}$ input is at logic low. When the transistor 402 is turned on, the output 404 of the circuit is pulled low by the collector terminal. A logic low at the output 404 of the circuit turns the receiver chain including the PLL regulator off.

Figure 5:
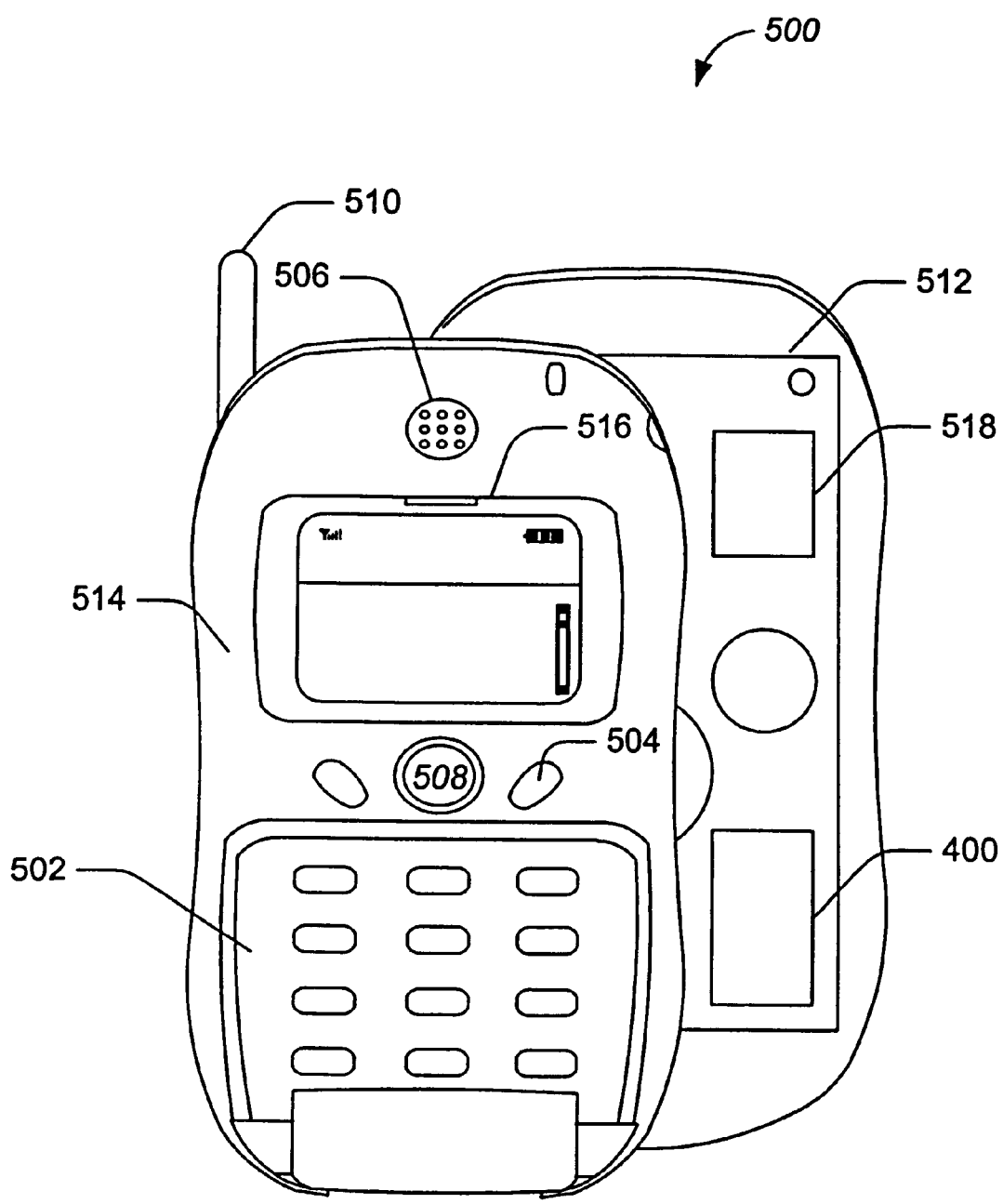
FIG. 5 is an exploded view of a cellular telephone system using an RF control circuitry that enables a "sleep" mode for the AMPS phones.

An exploded view of a cellular telephone system 500 using an RF control circuitry 400 that enables a "sleep" mode for the AMPS portion of the CDMA/AMPS dual mode phone is shown in FIG. 5. The cellular telephone system 500 also includes a key pad 502 and various other buttons and indicators 504. The telephone system 500 also includes a speaker 506, a microphone 508, an antenna 510, and other phone electronics 512 contained within a telephone housing 514. The phone electronics 518 includes communication electronics 518 and the RF control circuitry 400. A display unit 516 is used in conjunction with the keypad 502 to facilitate user inputs.

One of the advantages for incorporating a "sleep" mode according to the system and method described above into the AMPS wireless phone is the improvement in standby time for AMPS mode of operation in a dual mode wireless telephone. The proposed RF control circuitry 400 employing the slotted A/B mode offers substantial improvement in standby time. In one embodiment, illustrated in FIGS. 4A and 4B, over 50% savings (55.1 mA to 23.5 mA) in DC current consumption was achieved by turning the receiver on and off while keeping the main PLL on.

Other embodiments are within the scope of the following claims. For example, the control circuitry can be used in other wireless telephones such as a cellular/PCS dual band phone.

What is claimed is:

1. A method of reducing power consumption in a dual mode wireless receiver that monitors messages from a forward overhead channel in a standby mode, the method comprising:

decoding a pertinent word for the receiver in a particular message;

deactivating a PLL (Phase-Locked Loop) regulator to turn off the receiver while keeping a main PLL active;

turning on the PLL regulator again some time prior to a next pertinent word, only if necessary to satisfy a redundancy check, otherwise keeping the receiver turned off until the next message; and repeating the above steps for the next message.

2. The method of claim 1, further comprising:

performing synchronization of the receiver to the particular message.

3. The method of claim 1, wherein the dual mode wireless telephone is a CDMA/AMPS phone.

4. The method of claim 1, wherein the pertinent word is selected from a group comprising type A and type B words.

5. The method of claim 4, wherein the particular message includes five repeating type A words and five repeating type B words interleaved with each other.

6. The method of claim 5, wherein the redundancy check is satisfied if at least three out of five of the pertinent words are matched.

7. The method of claim 1, wherein the redundancy check is satisfied if the pertinent word matches a previously defined control filler word.

8. The method of claim 1, wherein the pertinent word is approximately 4.4 milliseconds in length.

9. The method of claim 8, wherein said some time is approximately one millisecond.

10. A method of operating both modes of a dual mode wireless telephone at reduced power, the method comprising:

deactivating a PLL (Phase-Locked Loop) regulator, while keeping a main PLL active, to turn off a receiver of said telephone after decoding a current relevant packet of data in a message; and turning on the PLL regulator again at an appropriate amount of time prior to a next relevant packet of data if the combined current and next packets of data in the message do not satisfy a redundancy check, the current packet of data indicates that further decoding is necessary, or the next packet of data is a start of another message.

11. A circuit for providing a sleep state for both modes of a dual mode wireless telephone, said telephone having a receiver for receiving RF signals, the circuit comprising:

a transistor having a base, a collector, and an emitter terminals, said collector terminal coupled to said receiver;

a supply voltage coupled to said collector terminal;

a mode signal providing input to the base terminal of said transistor; and a sleep signal providing input to the emitter terminal of said transistor, such that when the sleep signal is asserted in a particular mode indicated by the mode signal, the collector of said transistor is driven to turn the receiver off.

12. The circuit of claim 11, wherein the dual mode wireless telephone is a CDMA/AMPS phone.

13. The circuit of claim 12, wherein the mode signal determines whether the phone is in a CDMA or an AMPS mode.

14. The circuit of claim 11, wherein said particular mode indicates a CDMA sleep mode.

15. A dual mode wireless telephone system comprising:

a housing;

electronic components within the housing including a circuit for providing a sleep state for both modes of the dual mode phone, said telephone having a receiver for receiving RF signals, said circuit including:

a transistor having a base, a collector, and an emitter terminals, said collector terminal coupled to said receiver;

a supply voltage coupled to said collector terminal;

a mode signal providing input to the base terminal of said transistor;

a sleep signal providing input to the emitter terminal of said transistor, such that when the sleep signal is asserted in a particular mode indicated by the mode signal, the collector of said transistor is driven to turn the receiver off.

16. A method of operating both modes of a dual mode wireless telephone at reduced power, the method comprising:

providing a first signal level to an input terminal of a transistor to produce a first output to turn off a receiver of said telephone after decoding a current relevant packet of data in a message; and providing a second signal level to the input terminal to produce a second output to turn the receiver back on at an appropriate amount of time prior to a next relevant packet of data if the combined current and next packets of data in the message do not satisfy a redundancy check, the current packet of data indicates that further decoding is necessary, or the next packet of data is a start of another message.

* * * * *